Jan. 29, 1963     E. M. SMITH ETAL     3,075,551
CONTROL VALVE FOR FLUID FLOW SYSTEM
Filed March 11, 1957     6 Sheets-Sheet 1
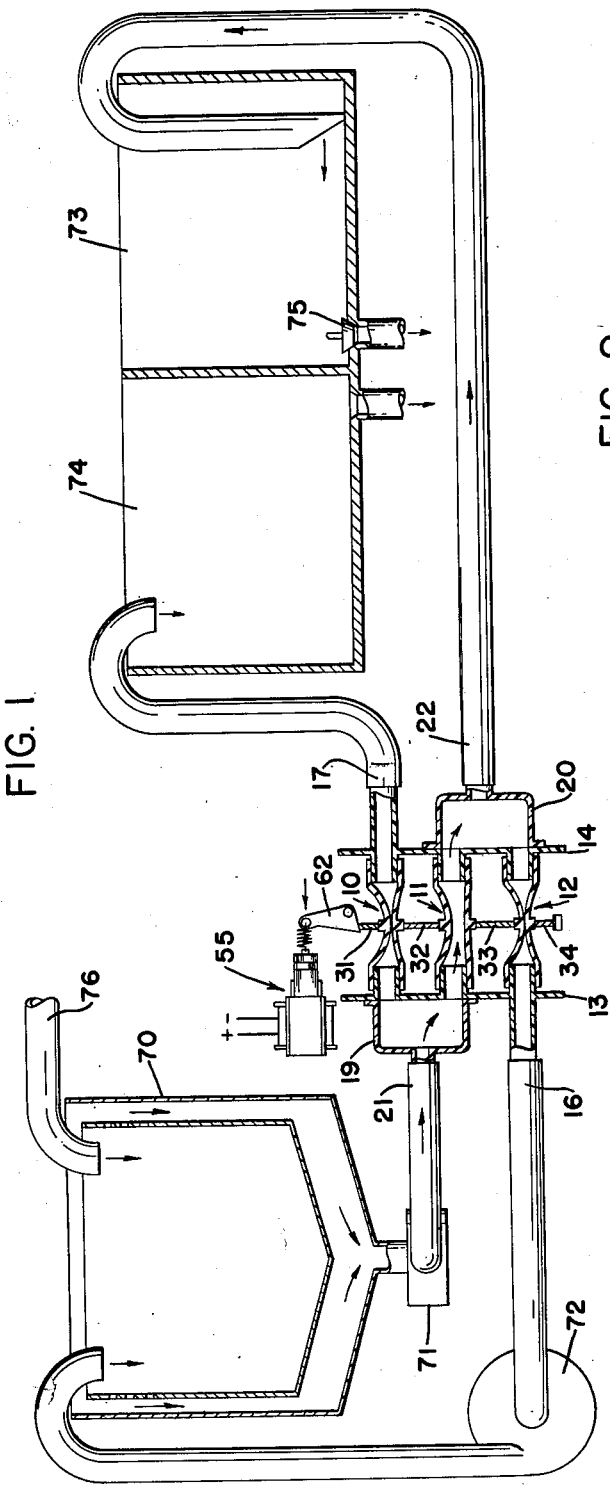
INVENTORS
EDWARD M. SMITH &
VIRGIL KENNETH STEIDLEY
BY
ATTORNEYS

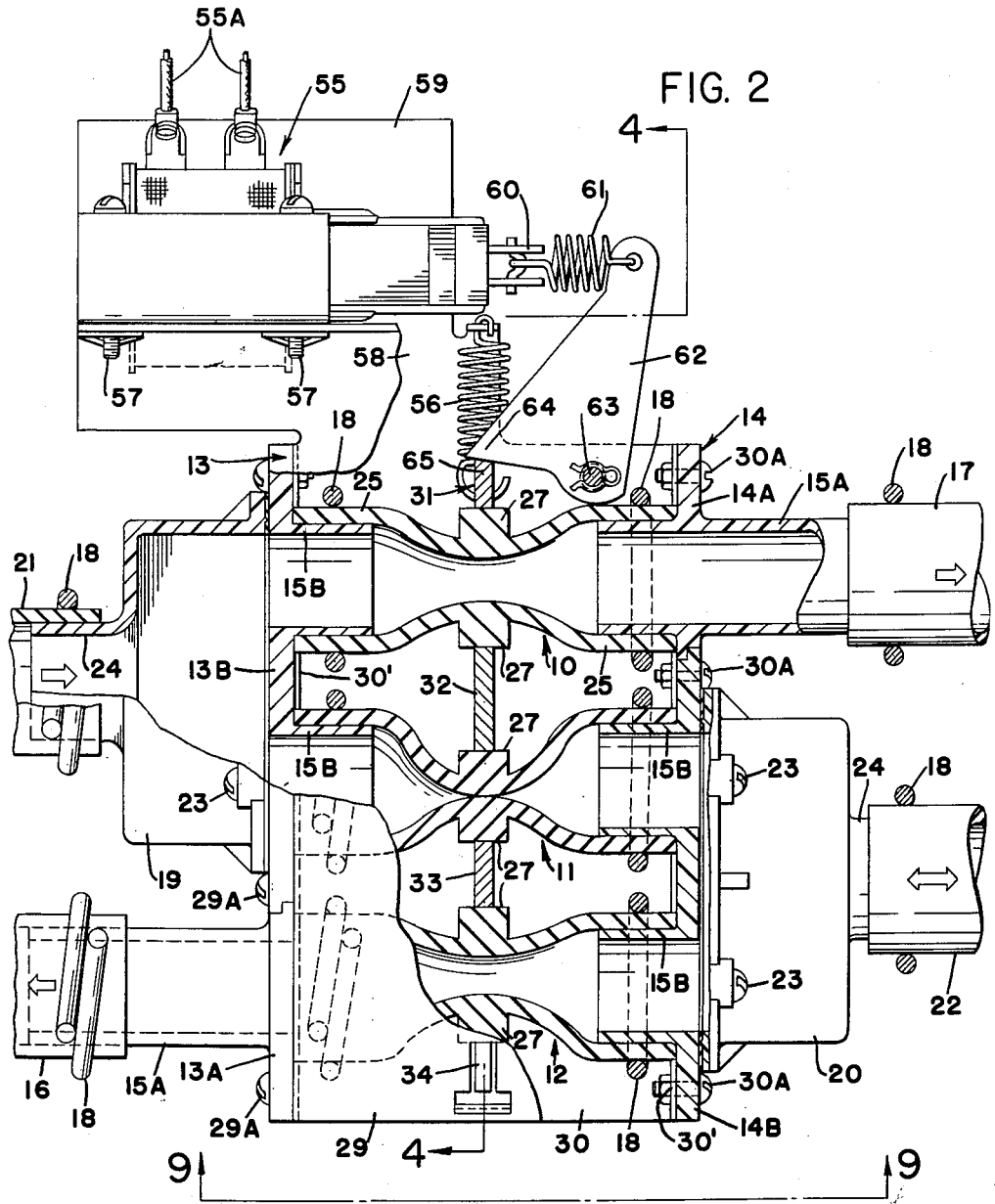

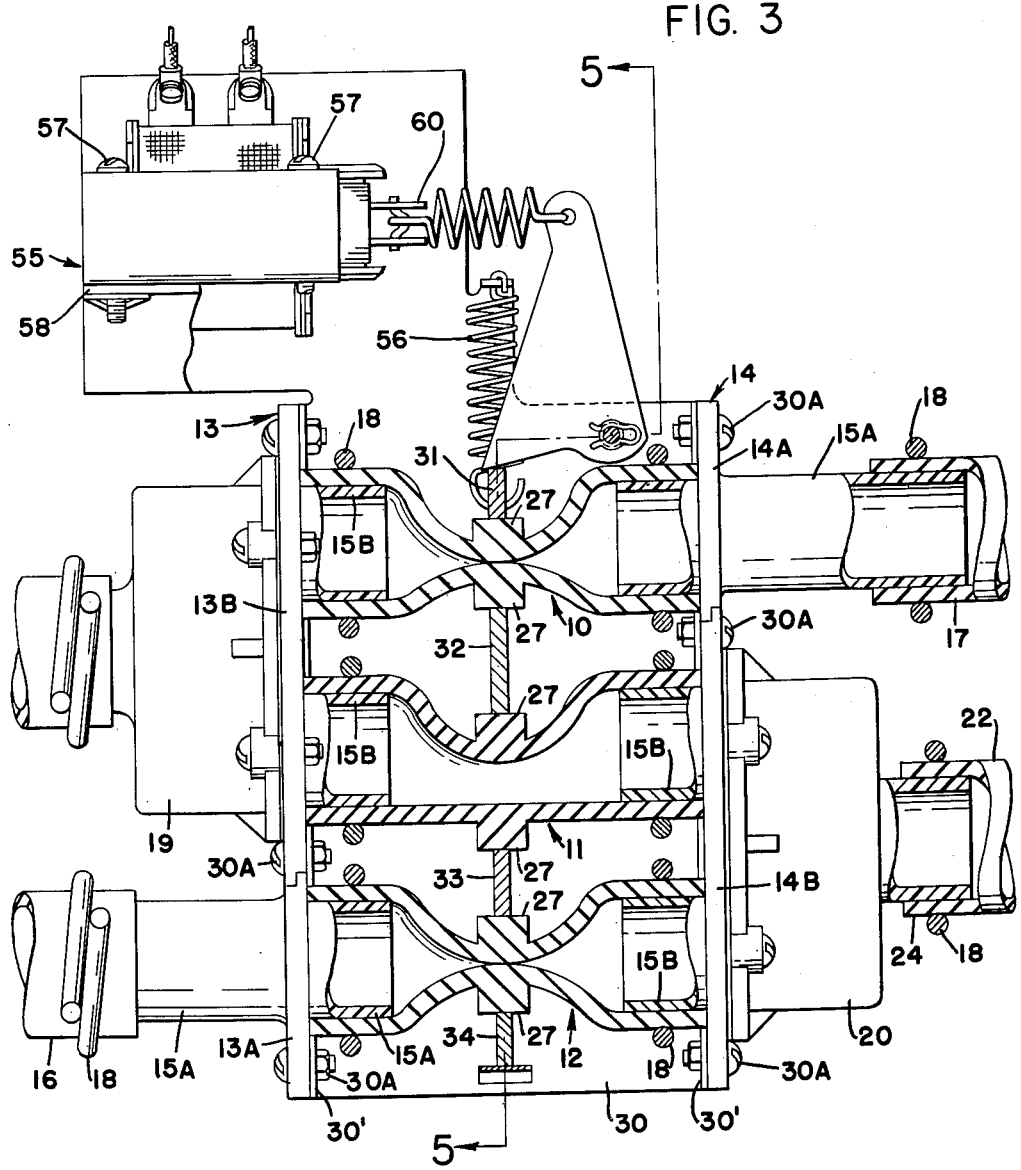

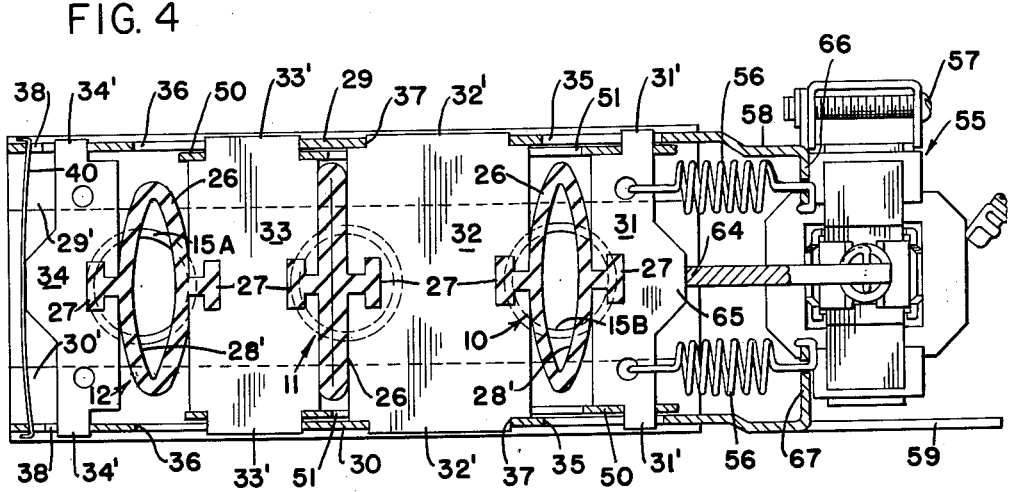
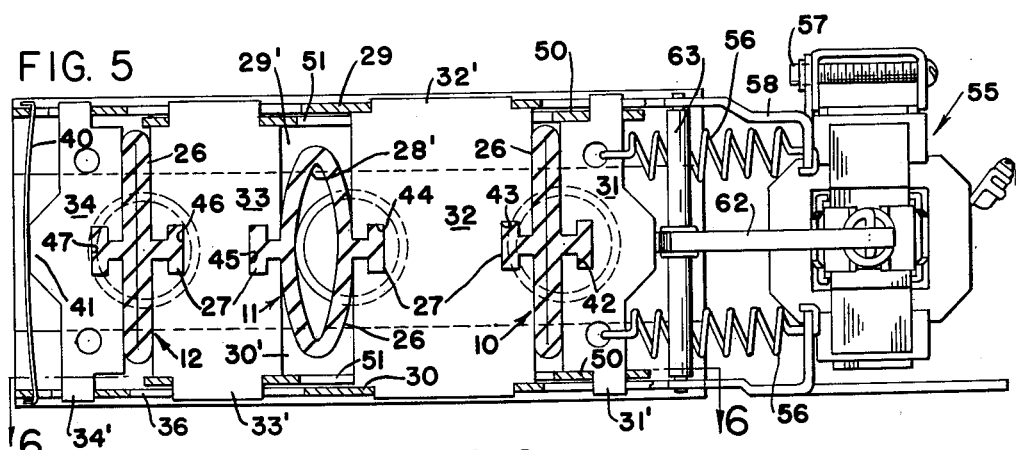
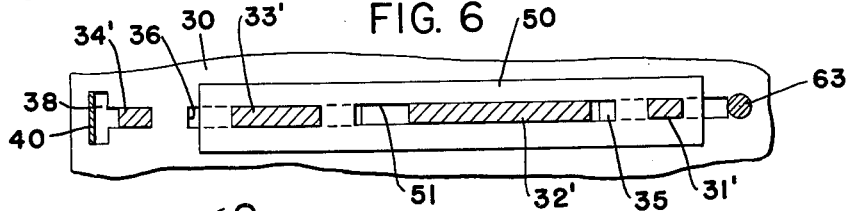
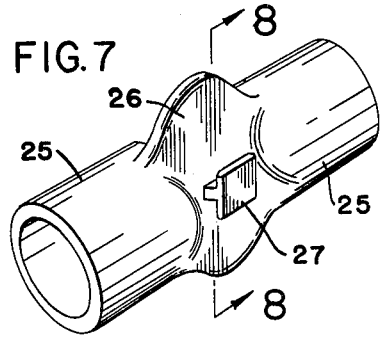
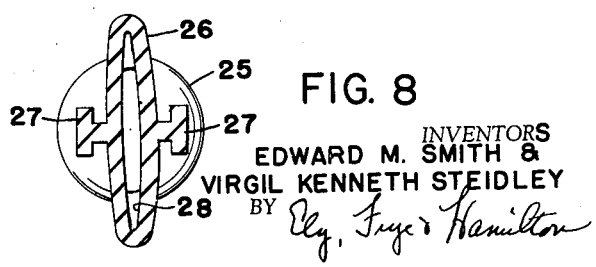
INVENTORS
EDWARD M. SMITH &
VIRGIL KENNETH STEIDLEY
ATTORNEYS Jan. 29, 1963  E. M. SMITH ETAL  3,075,551
CONTROL VALVE FOR FLUID FLOW SYSTEM
Filed March 11, 1957  6 Sheets-Sheet 5

INVENTORS
EDWARD M. SMITH &
VIRGIL KENNETH STEIDLEY
BY
ATTORNEYS

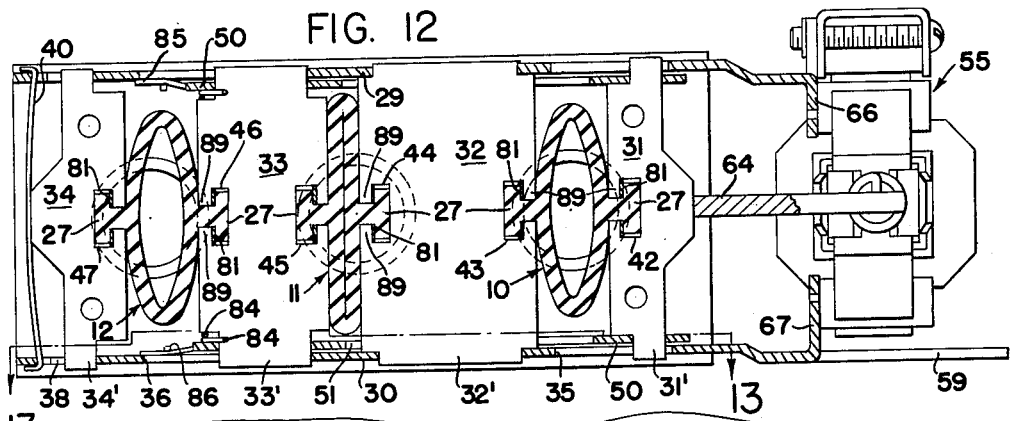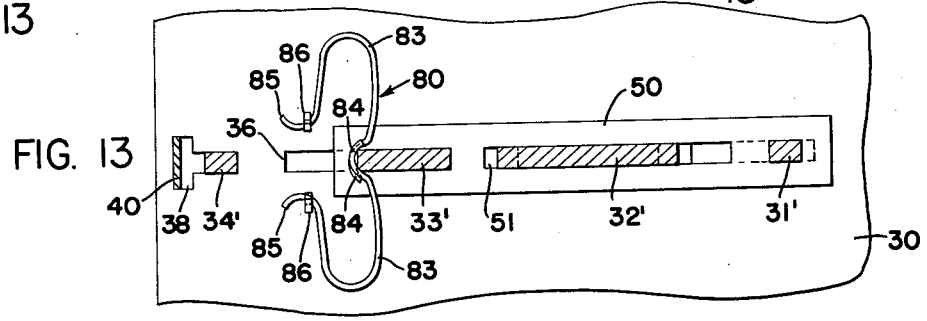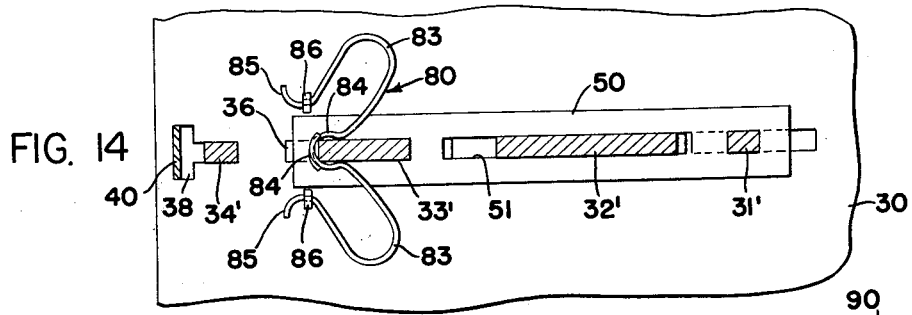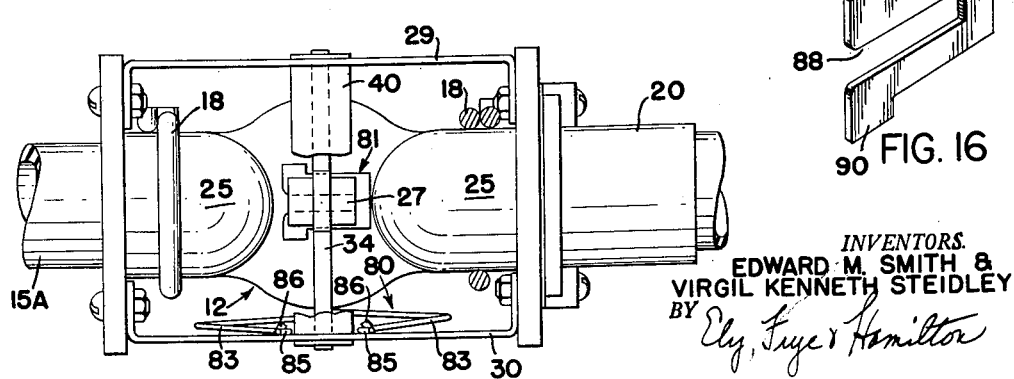

United States Patent Office 3,075,551
Patented Jan. 29, 1963

3,075,551
CONTROL VALVE FOR FLUID FLOW SYSTEM
Edward M. Smith and Virgil Kenneth Steidley, Mansfield, Ohio, assignors to Gorman-Rupp Industries, Inc., Bellville, Ohio, a corporation of Ohio
Filed Mar. 11, 1957, Ser. No. 645,375
12 Claims. (Cl. 137—609)

The invention relates generally to systems for handling the flow of fluids, and more particularly to an improved valve construction for controlling the flow through the system. This application is a continuation in part of our copending application Serial No. 614,761, filed October 8, 1956, now abandoned. The invention is readily adaptable to flow systems for circulating washing and rinsing liquids to and from automatic washing machines and the like.

The use of conventional valves such as butterfly or poppet valves in handling washing liquids containing foreign matter, including lint and abrasive material, gives rise to serious difficulties because the valve becomes clogged easily due to lint and other foreign matter catching on obstructions within the valve and interfering with its operation. Also, the valve seats wear or chip rapidly due to the passage of abrasive materials. Moreover, such valves require packing around the actuating parts extending into the valve to prevent leakage. A further disadvantage with the butterfly type of valve is that vacuum on one side of the closed valve tends to open it when not desired.

It is an object of the present invention to provide an improved flow system and control valve for handling fluids containing foreign matter and abrasives.

Another object is to provide an improved control valve of the pinch-tube type which overcomes the disadvantages of conventional valves in handling liquids containing foreign matter, and which provides full volume of flow in open position.

A further object is to provide an improved valve which is adapted to be made in single or multiple construction with a single actuating means.

Another object is to provide an improved pinch-tube valve which is positively opened and positively closed.

A still further object is to provide an improved pinch-tube valve which is especially adapted for solenoid operation.

Finally it is an object to provide an improved flow system and control valve which is simple, economical and durable, and requires a minimum of maintenance and repair.

These and other objects are accomplished by the parts, combinations and arrangements comprising the present invention, preferred embodiments of which are illustrated in the accompanying drawings and described in detail herein. Various modifications and changes in details of construction are comprehended within the scope of the invention as defined in the appended claims.

A three-tube valve unit of the improved construction may be embodied in a flow system for an automatic washing machine, one of the tubes controlling flow from the drain pump of the machine to waste, another controlling the flow of suds from the drain pump to a storage receptacle and the third tube controlling the flow of suds from the storage receptacle to a pump supplying the washing machine and located below the suds level in the storage receptacle, the three valve tubes being mounted in the unit in parallel for operation by a single actuating means.

In the drawings:

FIG. 1 is a schematic view showing the flow system for an automatic washing machine and embodying a three-tube valve unit of the improved construction operatively connected to a solenoid.

FIG. 2 is an enlarged vertical sectional view, partly in elevation, of the valve shown in FIG. 1 with the solenoid de-energized.

FIG. 3 is a view similar to FIG. 2 with the solenoid energized.

FIG. 4 is a sectional view on line 4—4 of FIG. 2.

FIG. 5 is a sectional view on line 5—5 of FIG. 3.

FIG. 6 is a fragmentary sectional view on line 6—6 of FIG. 5.

FIG. 7 is a perspective view of one of the valve tubes detached.

FIG. 8 is a cross sectional view thereof on line 8—8 of FIG. 7.

FIG. 9 is a bottom plan view on line 9—9 of FIG. 2.

FIG. 12 is a sectional view similar to FIG. 4 of a three-tube valve unit having a slightly modified construction.

FIG. 13 is a fragmentary sectional view on line 13—13 of FIG. 12, showing one of the improved springs for returning the pinch-tube valves to normal position when the solenoid is de-energized.

FIG. 14 is a similar view showing the position of the spring when the solenoid is energized.

FIG. 15 is a bottom plan view of the modified unit.

FIG. 16 is a detached perspective view of a metal clip for use under the projecting ears on the pinch-tube valves.

Figure 10:
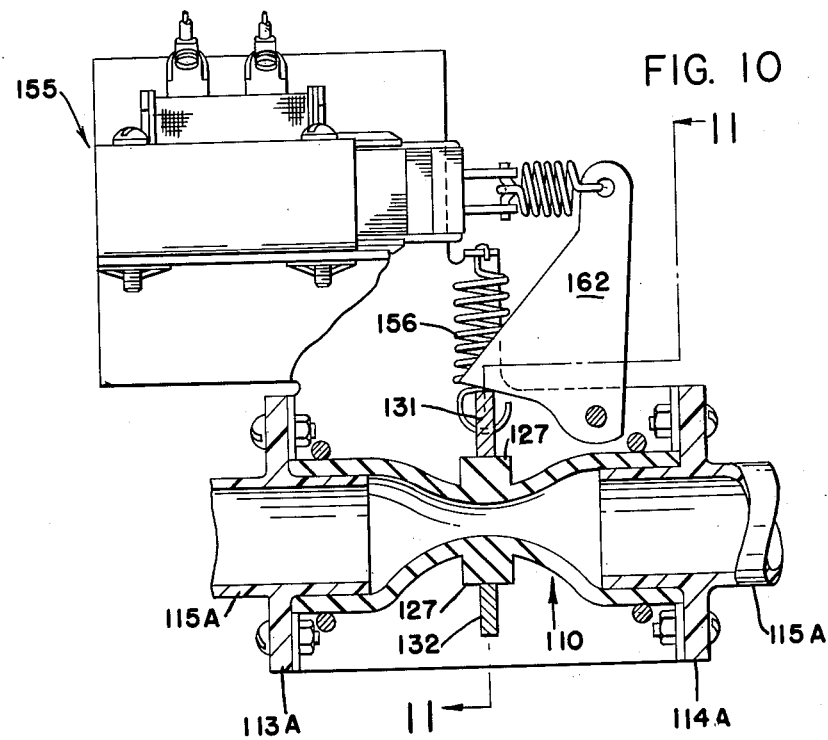
FIG. 10 is a view similar to FIG. 2 of a single tube valve unit.

Referring particularly to FIGS. 2-5, the valve unit comprises three vertically spaced valve tubes 10, 11 and 12 arranged in parallel relation between two opposed connector plates 13 and 14. Each of the connector plates may consist of two abutting sections, plate 13 comprising sections 13A and 13B, and plate 14 comprising sections 14A and 14B. The smaller plates 13A and 14A each have a connector tube portion 15A extending transversely therethrough and the larger plates 13B and 14B each have two connector tube portions 15B extending inwardly therefrom. The three connector tube portions are shown spaced apart at substantially equal intervals but this spacing may be varied as desired.

Preferably the plate sections and connector tube portions are integrally molded in rigid form out of a suitable plastic resin or other non-corrosive material. The connector tubes 15A are connected to flexible conduits or hoses 16 and 17, respectively, preferably by means of spring wire clamps 18, and the pairs of connector tubes 15B are connected into manifolds 19 and 20, respectively, which are in turn connected to conduits 21 and 22, respectively, by means of similar clamps 18. The manifolds may be of the same material as the plates 13 and 14 and are secured to the outer surfaces of the plate sections 13B and 14B by screws 23. Each manifold 19 and 20 has an outer connector tube 24 to which the conduits 21 and 22 are connected. Other grouping arrangements of the connector tube portions are easily accomplished by simple changes in location or design of the manifolds.

Between the plates 13 and 14, the upper connector tube 15B of plate section 13B is connected to the upper tube 15A of plate section 14A by valve tube 10; the lower connector tube 15B of plate section 13B is connected to the upper tube section 15B of plate section 14B by valve 11; and the lower connector tube 15A of plate section 13A is connected to the lower connector tube 15B of plate section 14B by valve 12. Clamping rings 18 may be used to clamp the valve tubes 10, 11 and 12 to the connector tubes.

The valve tubes 10, 11 and 12 are identical in construction and one of them will be described in detail by reference to FIGS. 7 and 8. The valve tubes are preferably molded from suitable resilient, elastomeric or rubbery material having high resistance to abrasion and maximum flexing life. Each valve tube has cylindrical end portions 25 and a transversely flattened portion 26 between the end portions. The flattened portion 26 is provided with outwardly projecting ears 27 on opposite sides, the ears being preferably T-shaped to provide overhanging portions, for a purpose to be described.

As shown in FIG. 8, the flattened portion 26 is molded normally to provide a flattened elliptical passageway 28 therethrough, and by reference to FIGS. 4 and 5 it will be seen that the cross sectional area of said passageway 28 as molded is substantially less than its area 28' in the fully open position of the valve when incorporated in the valve unit. This minimizes the amount of energy required fully to close the valve, and reduces the flexing stresses to which the valve is subjected during opening and closing, thereby prolonging its life.

The cross sectional area of the passageways 28 in fully open operating position as shown in FIGS. 4 and 5 is designed to be slightly greater than the internal cross sectional areas of the connector tubes 15A and 15B, or substantially equal to the internal cross sectional areas of the tubular end portions 25.

The connector plates 13 and 14 of the valve unit are preferably supported in spaced-apart parallel relation by a frame comprising side plates 29 and 30, preferably of metal, which have inturned angular flanges 29' and 30' secured to the inner surfaces of the connector plates by bolts 29A and 30A. Transverse operator bars for opening and closing the valves extend between the side plates 29 and 30 and have projecting tongues which enter into slots in the side plates 29 and 30. Preferably, the actuator bars are located midway between and parallel to the connector plates 13 and 14.

The operator bars are shown at 31, 32, 33 and 34, bar 31 having tongues 31' slidable in slots 35 in side plates 29 and 30, and bar 33 having tongues 33' slidable in slots 36 in side plates 29 and 30. Bar 32 has tongues 32' fixed in slots 37 in the side plates 29 and 30, and bar 34 has tongues 34' normally fixed in slots 38 in plates 29 and 30, but capable of limited sliding movement against the yielding pressure of leaf spring 40 secured in the outer ends of said slots 38, and pressing against a central projection 41 on the bar 34.

The bars 31, 32, 33 and 34 are provided with T-shaped slots for engaging around the T-shaped ears 27 of the valve tubes 10, 11 and 12, respectively. Slidable bar 31 has a T-shaped slot 42 at its inner edge engaging around the ear 27 on the adjacent side of valve 10. Stationary bar 32 has T-shaped slots 43 and 44 at opposite edges, slot 43 engaging around the ear 27 on the opposite side of valve 10 and slot 44 engaging around the ear 27 on the adjacent side of valve 11. Slidable bar 33 has T-shaped slots 45 and 46 at opposite edges, slot 45 engaging around the ear 27 on the opposite side of valve 11, and slot 46 engaging around the ear 27 on the adjacent side of valve 12. End bar 34 has a T-shaped slot 47 at its inner edge engaging the opposite side of valve 12.

If the slidable bars 31 and 33 are moved to the right, as shown in FIG. 4, they will pull or flex the flattened portions 26 of valves 10 and 12 to open position, the opposite sides of the valve being held fixed by the stationary bars 32 and 34, respectively. At the same time, bar 33 moves the valve 11 to closed position backed up by bar 32. If the slidable bars 31 and 33 are moved to the left, as shown in FIG. 5, valves 10 and 12 will be closed against back-up bars 32 and 34, and valve 11 will be pulled to open position by bar 33.

Accordingly, the valves 10, 11 and 12 have means for positively moving them in opposite directions to open and closed positions. Thus, there is no possibility of a valve taking a set when closed and failing to open properly. Moreover, the valves can not stay closed due to a vacuum in the line when they are intended to open, as is sometimes the case with an ordinary pinch valve.

In controlling the movement of the operator bars, motion may be imparted to the end bar 31 and transmitted therefrom to bar 33 by means of slotted guide bars 50 (FIG. 6) slidable along the inner surfaces of side plates 29 and 30. The tongues 31' of bar 31 are fixed in slots in one end of the guide bars 50 and the tongues 33' of bar 33 are fixed in slots in the opposite ends. The ends of stationary bars 32 extend slidably through elongated slots 51 in the guide bars 50, so that the bars 31 and 33 can move between the positions of FIGS. 4 and 5 without affecting the position of bar 32.

The means for moving the bar 31 to the left, as in FIG. 5, may be a linkage actuated by a solenoid indicated generally at 55, and the means for returning the bar to the position of FIG. 4 may be springs 56 attached to the bar. Terminal connections to solenoid 55 are indicated at 55A. However, one or both of these movements may be accomplished manually, or by any other suitable means. In the embodiments of FIGS. 1–9, the solenoid 55 is mounted by bolts 57 on a bracket extension 58 of side plate 29 and between said extension 58 and a protective shield extension 59 of side plate 30. The axis of armature 60 of the solenoid is midway between the side plates and parallel thereto.

The end of the solenoid 60 is connected to one end of a helical spring 61 and the other end of the spring is connected to the outer end of a bellcrank lever 62 pivoted on a cross shaft 63 mounted at its ends in the side plates 29 and 30. A cam 64 on the lever engages the central projection 65 of actuator bar 31. The lever 62 is proportioned to substantially decrease the amount of travel of the operator bar 31 over the travel of the armature, so as to minimize the amount of force required to obtain full opening of the valves, thereby allowing the use of a relatively small solenoid.

In the positions of FIGS. 2 and 4, the solenoid is de-energized and the operator bar 31 is urged to the position shown by the springs 56 attached at one end to the bar 31 and at their other ends to bracket ears 66 and 67 on the side plate extensions 58 and 59, respectively. In the position of FIGS. 3 and 5, the solenoid is energized, causing the bell crank lever 63 to force the bar 31 inwardly, against the tension of springs 56. When the solenoid is again de-energized, the springs 56 return the bar 31 to the position of FIGS. 2 and 4.

The purpose of the leaf spring 40 backing up the bar 34 is to insure complete closing of both valves 10 and 12 in the position of FIGS. 3 and 5 without requiring close tolerances in the connections between the operator bar 31, the guide bars 50 and the operator bar 33. In other words, the spring 40 allows a limited amount of over travel of bar 34 so that valve 12 can close slightly ahead of valve 10 and still allow valve 10 to close completely.

In a similar manner, the spring 61 allows a limited amount of over travel of the armature 60 when the solenoid is energized, to insure that the armature reaches the end of its inward movement, and prevents burning out of the coil which otherwise might occur if inaccurate connections in the linkage did not permit the armature to seat when valves 10 and 12 were fully closed.

In the flow system embodying the improved three-tube valve unit shown in FIG. 1, the washing machine 70 has its drain pump 71 connected to conduit 21, which is connected to manifold 19 of the valve, and the suds return pump 72 is connected to conduit 16. On the other side of the valve unit, conduit 22, which is connected to manifold 20, leads into the top and extends to the bottom of a storage receptacle 73 which is shown as one-half of a twin laundry tub, and conduit 17 discharges into the other half 74 of the laundry tub.

During that part of the washing cycle when it is desired to discharge the suds from the machine 70, the solenoid 55 is energized to open valve 11 and close valves 10 and 12, as shown in FIG. 1, corresponding to the position of FIGS. 3 and 5. In this position the drain pump 71 pumps the suds from the washer 70 into the tub 73, where they are retained by the stopper 75.

When the machine has been emptied of suds, the rinsing cycle is begun by introducing rinse water through fill line 76. During rinse water discharge, the solenoid 55 is de-energized to open valves 10 and 12 and close valve 11 in the position of FIGS. 2 and 4, and the drain pump 71 discharges the rinse water through valve 10 to tub 74 or any suitable waste. When it is desired to return the suds water from tub 73 to the washing machine, the pump 72 is operated to pump the suds water through valve 12, and the location of the pump 72 below the suds level in tub 73 serves to prime the pump 72 when valve 12 is opened. The operation of pump 72 may be automatically controlled by a timer or by manual operation of a switch.

Figure 11:
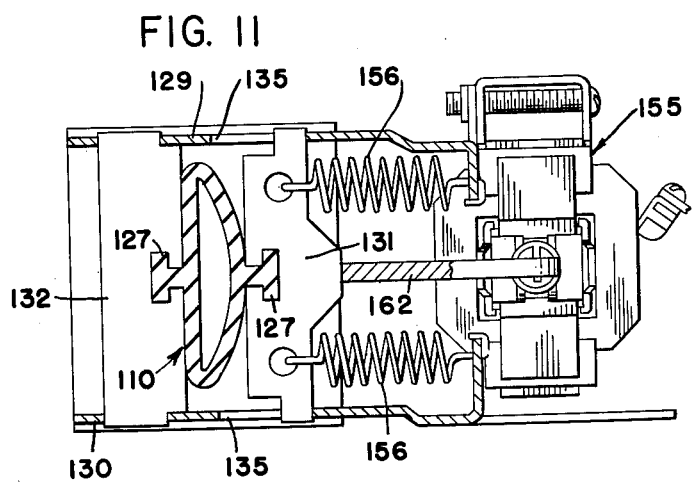
FIG. 11 is a sectional view on line 11—11 of FIG. 10.

The single valve unit shown in FIGS. 10 and 11 has one valve tube 110 which is closed by a solenoid 155 through a lever 162 engaging actuator bar 131 movable in slots 135 in side plates 129 and 130. A bar 132 fixed in slots in the side plates backs up the valve tube on the side opposite to the bar 131. Each of the bars 131 and 132 has a T-shaped slot engaging around the ears 127 of the valve. When the solenoid 155 is de-energized the springs 156 pull the valve to open position as shown in FIGS. 10 and 11. The valve tube connects tube portions 115A which are formed on plates 113A and 114A and adapted for connection with suitable fluid conduits.

Obviously, the novel valve unit can be constructed with two valve tubes, or with more than three valve tubes, within the scope of the invention.

The improved valve unit requires no packing, handles fluids containing foreign matter including abrasive material over long periods without clogging, and is readily adaptable to flow systems wherein the valves are required to be positively closed and positively opened to fully open position.

The construction of the three-valve unit shown in FIGS. 12–15 is substantially identical with that shown in FIGS. 1–9, as shown by like reference numerals, except that the springs 56 for returning the bars 31 and 33 to normal position when the solenoid is de-energized are omitted, and the two springs 80 shown in FIGS. 13 and 14 are substituted therefor. Also, metal clips 81 as shown in FIG. 16 are inserted under the projecting T-shaped ears 27 on opposite sides of each of the valve tubes 10, 11 and 12, and within the T-shaped slots 42, 43, 45, 46 and 47 in the bars 31, 32, 33 and 34, respectively.

The springs 80 each prefereably comprise two U-shaped parts 83 of spring wire having curved inner overlapping ends 84 engaging the lower edge of bar 33 (the left edge as shown in FIGS. 4 and 12). From their overlapping ends the U-shaped parts 83 extend laterally in opposite directions from the bar 33 in a butterfly arrangement, and their outer free ends 85 engage projections 86 formed on the side plates 29 and 30.

As shown in FIG. 13, when the solenoid 55 is de-energized and the springs 80 have returned the bar 33 to its normal position, as well as bar 31 through the guide bars 50, the valves 12 and 10 are open and valve 11 is closed. In this position the legs of the U-shaped spring parts 83 are exerting substantially the full force of the springs against the bar 33 in a direction to urge it to the right as viewed in FIG. 13.

When the solenoid 55 is energized, causing the cam 64 to move bar 31, guide bar 50 and bar 33 to the left as shown in FIG. 14, the spring parts 83 are rotated about the projections 86 as centers by the pressure of bar 33. As the U-shaped spring parts rotate, the resilience of one part begins to oppose that of the opposite part, with the result that their combined resistance to movement of the bar 31 to the left decreases.

Thus, as the armature of the solenoid 55 approaches the end of its inward movement and the valves 10 and 12 become fully closed, the solenoid has progressively less spring resistance to overcome, as distinguished from the condition shown in FIG. 5, where the coil springs 56 provide an increasing force to be overcome by the armature as it approaches the end of its inward movement. Accordingly, by using the springs 80, a solenoid requiring less power can be used to accomplish the desired result.

Referring to the metal clips 81, these are preferably thin U-shaped pieces each having a central slot 88 for slidably fitting around the stem of one of the T-shaped ears 27. The legs 89 formed by the T-shaped slots in the bars 31, 32, 33 and 34 fit under the clips 81 and between the clips and the body of the respective valve tube, so that each clip abuts the underside of the cross bar of the T.

The clips 81 preferably have outwardly projecting wings 90 opposite the open end of the slot which act as stops for engaging the respective operator bars 31, 32, 33 and 34 to limit lateral movement of the clips in one direction. Lateral movement in the other direction is prevented by the closed end of the clips engaging the stem of the T-shaped ears 27.

When the operator bars pull on the ears 27 to open the valve tubes, the clips 81 act to distribute the pull evenly over the cross bars of the ears so that there is no possibility of distortion of the ears on one side or the other resulting in inadequate or improper opening of the valve tube.

What is claimed is:

1. A valve unit comprising opposed plates having aligned connector tube portions, side plates supporting said opposed plates in predetermined spaced relation, a pinch-tube valve connecting said tube portions and having an intermediate flexible pinch section, valve operator bars extending transversely of said valve and connected one to each side of said pinch section, said side plates having slots slidably receiving the ends of one of said bars to permit movement thereof toward and away from said pinch section for flexing one side of said valve, the other of said bars having its ends secured to said side plates, a lever pivoted on said side plates for actuating said movable bar in one direction, and spring means connected between said movable bar and said side plates for actuating said movable bar in the opposite direction.

2. A valve unit comprising opposed plates having at least two pairs of aligned connector tube portions, pinch-tube valves arranged in parallel between said plates and connecting said tube portions, side plates supporting said opposed plates in predetermined spaced relation, a fixed valve operator bar secured to and extending transversely of said side plates between said valves, valve operator bars extending transversely of said side plates on the outer sides of said valves and movably mounted in said side plates for movement toward and away from said valves, means connecting said bars intermediate their ends to opposite sides of said valves, means operatively connecting the outer ends of said movable bars, and means for actuating one of said movable bars in opposite directions to alternately open one valve and close the other.

3. A valve unit comprising opposed plates having at least two pairs of aligned connector tube portions, pinch-tube valves arranged in parallel between said plates and connecting said tube portions, side plates supporting said opposed plates in predetermined spaced relation, a fixed valve operator bar secured to and extending transversely of said side plates between said valves, valve operator bars extending transversely of said side plates on the outer sides of said valves and movably mounted in said side plates for movement toward and away from said valves, means connecting said bars intermediate their ends to opposite sides of said valves, means operatively connecting the outer ends of said movable bars, lever means mounted on said side plates for actuating one of said movable bars in one direction to open one valve and close the other, and spring means connected between said one movable bar and said side plates to actuate said one movable bar in the opposite direction to reverse the positions of said valves.

4. A valve unit comprising opposed plates having at least two pairs of aligned connector tube portions, pinch-tube valves arranged in parallel between said plates and connecting said tube portions, side plates supporting said opposed plates in predetermined spaced relation, a fixed valve operator bar secured to and extending transversely of said side plates between said valves, valve operator bars extending transversely of said side plates on the outer sides of said valves and movably mounted in said side plates for movement toward and away from said valves, means connecting said bars intermediate their ends to opposite sides of said valves, means operatively connecting the outer ends of said movable bars, a lever mounted on said side plates operatively engaging one of said movable bars, a solenoid operatively connected to said lever for actuating said one movable bar in one direction to open one valve and close the other, and spring means connected between said one movable bar and said side plates to actuate said one movable bar in the opposite direction to reverse the position of said valves.

5. A valve unit including a frame, at least three pinch-tube valves mounted in parallel in said frame and having flexible pinch sections between their ends, valve operator bars extending transversely of said valves on opposite sides of said pinch sections and secured thereto, the outer bar at one end of the unit being movably mounted in the frame for movement toward and away from the adjacent first valve, the bar between the second and third valves being movably mounted in the frame for movement toward and away from said valves, means operatively connecting said movable bars, the bar between the first and second valves being secured to the frame, the outer bar at the other end of the unit being mounted in the frame for limited yielding movement away from said third valve, and means for actuating said first outer bar in opposite directions to close said first and third valves while opening said second valve and to open said first and third valves while closing said second valve.

6. A valve unit including a frame, at least three pinch-tube valves mounted in parallel in said frame and having flexible pinch sections between their ends, said frame having side plates parallel to the axes of said valves, aligned valve operator bars extending transversely of said valves on opposite sides of said pinch sections, means securing the edges of said bars to adjacent sides of said pinch sections, the side plates having slots slidably receiving the ends of the outer bar at one end of the unit and the ends of the bar between the second and third valves permitting movement of said bars toward and away from said valves, guide bars operatively connecting said movable operator bars, means securing said bar extending between said first and second valves to said plates, means mounting the bar at the other end of the unit in said side plates for limited yielding movement away from said third valve, and means for actuating said first outer bar in opposite directions to close said first and third valves while opening said second valve and to open said first and third valves while closing said second valve.

7. A valve unit including a frame, at least three pinch-tube valves mounted in parallel in said frame and having flexible pinch sections between their ends, valve operator bars extending transversely of said valves on opposite sides of said pinch sections and secured thereto, the outer bar at one end of the unit being movably mounted in the frame for movement toward and away from the adjacent first valve, the bar between the second and third valves being movably mounted in the frame for movement toward and away from said valves, means operatively connecting said movable bars, the bar between the first and second valves being secured to the frame, the outer bar at the other end of the unit being mounted in the frame for limited yielding movement away from said third valve, lever means pivoted on said side plates operatively engaging said first outer bar, solenoid means to actuate said lever means to close said first and third valves while opening said second valve, and spring means to actuate said first outer bar in the opposite direction to open said first and third valves while closing said second valve.

8. A valve unit including a frame, at least three pinch-tube valves mounted in parallel in said frame and having flexible pinch sections between their ends, said frame having side plates parallel to the axes of said valves, aligned valve operator bars extending transversely of said valves on opposite sides of said pinch sections, means securing the edges of said bars to adjacent sides of said pinch sections, the side plates having slots slidably receiving the ends of the outer bar at one end of the unit and the ends of the bar between the second and third valves permitting movement of said bars toward and away from said valves, guide bars operatively connecting said movable operator bars, means securing said bar extending between said first and second valves to said plates, means mounting the bar at the other end of the unit in said side plates for limited yielding movement away from said third valve, lever means pivoted on said side plates operatively engaging said first outer bar, solenoid means to actuate said lever means to close said first and third valves while opening said second valve, and spring means to actuate said first outer bar in the opposite direction to open said first and third valves while closing said second valve.

9. A valve unit comprising a frame, a pinch-tube valve secured at its ends in the frame and having an intermediate flexible pinch section, flexible T-shaped ears projecting outwardly from opposite sides of said pinch section, valve operator bars extending transversely of said valve and having T-shaped slots forming legs fitting under said ears, metal clip plates interposed between said legs and the cross bars of said ears, one of said bars being movable on said frame for flexing one side of said pinch section, and the other of said bars being fixed on said frame, and means for actuating said movable bar in opposite directions to open and close the valve.

10. A valve unit comprising a frame, a pinch-tube valve secured at its ends in the frame and having an intermediate flexible pinch section, flexible T-shaped ears projecting outwardly from opposite sides of said pinch section, valve operator bars extending transversely of said valve and having T-shaped slots forming legs fitting under said ears, U-shaped metal clip plates fitting around the stems of said ears and between the cross bars of said ears and the legs of said cross bars, said clips having outwardly projecting wings opposite their open ends to engage the valve operator bars and limit lateral movement of the clips in one direction, one of said bars being movable on said frame for flexing one side of said pinch section, and the other of said bars being fixed on said frame, and means for actuating said movable bar in opposite directions to open and close the valve.

11. A valve unit comprising a frame, a pinch-tube valve secured at its ends in the frame and having an intermediate flexible pinch section, valve operator bars connected one to each side of said pinch section, one of said bars being movable on said frame for flexing one side of said pinch section and the other of said bars being fixed on said frame, means for actuating said movable bar in one direction, and spring means for returning said movable bar in the opposite direction, said spring means comprising a U-shaped spring having one end urging the movable bar and the other end pivoted on the frame to allow rotation of the spring in a direction to decrease its resistance as the movable bar is moved in said one direction by said actuating means.

12. A valve unit comprising a frame, a pinch-tube valve secured at its ends in the frame and having an intermediate flexible pinch section, valve operator bars connected one to each side of said pinch section, one of said bars being movable on said frame for flexing one side of said pinch section and the other of said bars being fixed on said frame, means for actuating said movable bar in one direction and spring means for returning said movable bar in the opposite direction, said spring means comprising two U-shaped parts extending in laterally opposite directions and having inner overlapping ends urging the movable bar in said opposite direction, the outer ends of said parts being pivoted on said frame to allow rotation of the parts in a direction to decrease their resistance as the movable bar is moved in said one direction by the actuating means.

References Cited in the file of this patent

UNITED STATES PATENTS

| | | |
|---|---|---|
| 1,930,983 | Russell | Oct. 17, 1933 |
| 2,396,544 | Voyle | Mar. 12, 1946 |
| 2,471,623 | Hubbell | May 31, 1949 |
| 2,625,932 | Salisbury | Jan. 20, 1953 |
| 2,642,085 | Geldhof | June 16, 1953 |
| 2,662,384 | Morrison | Dec. 15, 1953 |
| 2,769,397 | Bolger | Nov. 6, 1956 |
| 2,810,991 | Mead | Oct. 29, 1957 |

FOREIGN PATENTS

| | | |
|---|---|---|
| 164,899 | Australia | Aug. 31, 1955 |
| 809,502 | Germany | July 30, 1951 |